US006807566B1

(12) United States Patent
Bates et al.

(10) Patent No.: US 6,807,566 B1
(45) Date of Patent: Oct. 19, 2004

(54) METHOD, ARTICLE OF MANUFACTURE AND APPARATUS FOR PROCESSING AN ELECTRONIC MESSAGE ON AN ELECTRONIC MESSAGE BOARD

(75) Inventors: Cary Lee Bates, Rochester, MN (US); Gene Richard Cobb, Mantorville, MN (US); Donald H. Hoerle, Oronoco, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 09/640,471

(22) Filed: Aug. 16, 2000

(51) Int. Cl.⁷ .............................................. G06F 15/16
(52) U.S. Cl. ...................... 709/206; 709/217; 709/219; 709/224; 345/738; 345/751; 345/759
(58) Field of Search ................................ 709/206, 217, 709/219, 224; 345/738, 751, 759

(56) References Cited

U.S. PATENT DOCUMENTS

| | | | | |
|---|---|---|---|---|
| 6,260,064 B1 | * | 7/2001 | Kurzrok ...................... | 709/224 |
| 6,336,133 B1 | * | 1/2002 | Morris et al. ................ | 709/204 |
| 6,339,784 B1 | * | 1/2002 | Morris et al. ................ | 709/204 |
| 6,362,837 B1 | * | 3/2002 | Ginn .......................... | 345/751 |
| 6,496,851 B1 | * | 12/2002 | Morris et al. ................ | 709/204 |

OTHER PUBLICATIONS

Amazon.com, Member Pages Frequently Asked Questions about Reviewers, May, 24, 2004, pp. 1–2.
Epinions.com, The Web of Trust, May 24, 2004, pp. 1–3.
Slashdot. Org, Comment & Moderation FAQ, May 24, 2004, pp. 1–17.
Slashdot.org, Meta–Moderation FAQ, May 24, 2004, pp. 1–3.
Slashdot.org, Slashdot Moderation, Feb. 16, 2000, pp. 1–7.
Slashdot.org, Alone in the Universe?; Feb. 16, 2000, pp. 1–3.
Slashdot.org, Alone in the Universe?, Feb. 16, 2000, pp. 1–5.
Slashdot.org, Alone in the Universe?, Feb. 16, 2000, pp. 1–10.
Slashdot.org, Slashdot FAQ, Mar. 2, 2000, pp. 1–9 (archived date).
Slashdot.org, Slashdot Moderation FAQ, Oct. 13, 1999, pp. 1–7 (archived date).
Slashdot.org, Slashdot FAQ, Oct. 13, 1999, pp. 1–8 (archived date).

* cited by examiner

*Primary Examiner*—Zarni Maung
*Assistant Examiner*—Jinsong Hu
(74) *Attorney, Agent, or Firm*—Moser, Patterson & Sheridan, LLP (57) ABSTRACT

A method, article of manufacture, and apparatus for processing an electronic message on an electronic message board. In one embodiment, a message rating is established and adjusted for an electronic message to be posted by a first user on the electronic message board. The message rating is adjusted in response to feedback from a second user, where the degree of the rating adjustment is dependent upon a user rating of the second user. In another embodiment, a first user rating is established and adjusted for a first user posting the electronic message on the message board. The first user rating is adjusted in response to feedback from a second user, where the degree of adjustment is dependent upon a second user rating of the second user.

38 Claims, 6 Drawing Sheets

| STOCK TRADING OF XYZ STOCK | | | |
|---|---|---|---|
| MESSAGE RATING | TOPIC | USER ID | DATE/TIME |
| 90 | EARNINGS REPORT | CARY (75) | 7/10/00 17:30 |
| 25 | BOARD IS LYING | ALICE (1) | 7/08/00 21:32 |
| 75 | QUARTERLY MEETING | BOB (20) | 7/08/00 11:11 |
| 90 | IPO OF XYZ STOCK | JOHN (75) | 7/06/00 07:00 |

METHOD, ARTICLE OF MANUFACTURE AND APPARATUS FOR PROCESSING AN ELECTRONIC MESSAGE ON AN ELECTRONIC MESSAGE BOARD

BACKGROUND OF THE INVENTION

1. Field of the Invention

The invention relates to techniques that facilitate the exchange of information among computers. More particularly, the invention relates to a method, article of manufacture and apparatus for processing an electronic message on an electronic message board.

2. Background of the Related Art

Electronic message boards provide a popular forum to view or provide information on a particular topic of interest. Users of computer systems may access these electronic message boards in a window environment through the Internet or a private message board provider. Once a user accesses a particular electronic message board, the user may read existing or previously posted electronic messages on the electronic message board. The user may also post a new electronic message or respond to an existing electronic message on the electronic message board.

One problem that is associated with electronic message boards is the presence of "junk posts" on electronic message boards. In other words, the electronic message boards may contain many previously posted electronic messages having no relevance to a particular topic of discussion. Such "junk posts" may comprise advertisements or personal attacks upon other users. The presence of these "junk posts" distracts a user from viewing more relevant electronic messages related to the particular topic of discussion on the electronic message board.

Therefore, a need exists for a method, article of manufacture and apparatus for processing electronic messages on the message board to enable a user to filter or bypass the "junk posts" or other electronic messages unrelated to the topic of discussion on the message board.

SUMMARY OF THE INVENTION

The invention provides a method, article of manufacture and apparatus for processing an electronic message on an electronic message board. Specifically, the method comprises establishing a message rating for an electronic message to be posted by a first user on an electronic message board and adjusting the message rating in response to feedback or comments from a second user. The degree of the rating adjustment is dependent upon a user rating of the second user.

In another embodiment, a method for determining a user rating of a first user posting an electronic message board is provided. The method comprises establishing a user rating of a first user and adjusting the user rating of the first user in response to feedback from a second user, where the degree of the rating adjustment is dependent upon the user rating of the second user.

An apparatus comprising a memory and a central processing unit (CPU) is also provided. The memory stores an electronic message board program. The CPU performs a method upon executing the electronic message board program retrieved from the memory. The method performed comprises establishing a message rating for an electronic message to be posted by a first user on an electronic message board, and adjusting the message rating in response to feedback from a second user. The degree of the rating adjustment is dependent upon a user rating of the second user.

Additionally, a computer readable medium storing a software program is provided, where the software program, when executed by a computer, causes a central processing unit (CPU) to perform a method. In one embodiment of the computer readable medium, the method comprises establishing a message rating for an electronic message to be posted by a first user on an electronic message board, and adjusting the message rating in response to feedback from a second user. The degree of the rating adjustment is dependent upon a user rating of the second user. In another embodiment of the computer readable medium, the method comprises establishing a user rating of a first user and adjusting the user rating of the first user in response to feedback from a second user. The degree of the rating adjustment is dependent upon the user rating of the second user.

BRIEF DESCRIPTION OF THE DRAWINGS

A more particular description of embodiments of the invention, briefly summarized above, may be had by reference to the illustrations in the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE PREFERRED EMBODIMENT

The invention provides a method, article of manufacture, and apparatus for processing an electronic message on an electronic message board. In one embodiment, a message rating is established and adjusted for an electronic message to be posted by a first user on the electronic message board. The message rating is adjusted in response to feedback or comments from a second user, where the degree of the rating adjustment is dependent upon a user rating of the second user. In another embodiment, a user rating is established and adjusted for a first user posting the electronic message on the message board. The user rating is adjusted in response to feedback from a second user, where the degree of the rating adjustment is dependent upon a user rating of the second user.

The rating of electronic messages distinguishes important electronic messages from trivial or unimportant messages on the message board. In this manner, a user would avoid wasting time to read "junk posts" or other unimportant messages on the electronic message board.

Figure 1:
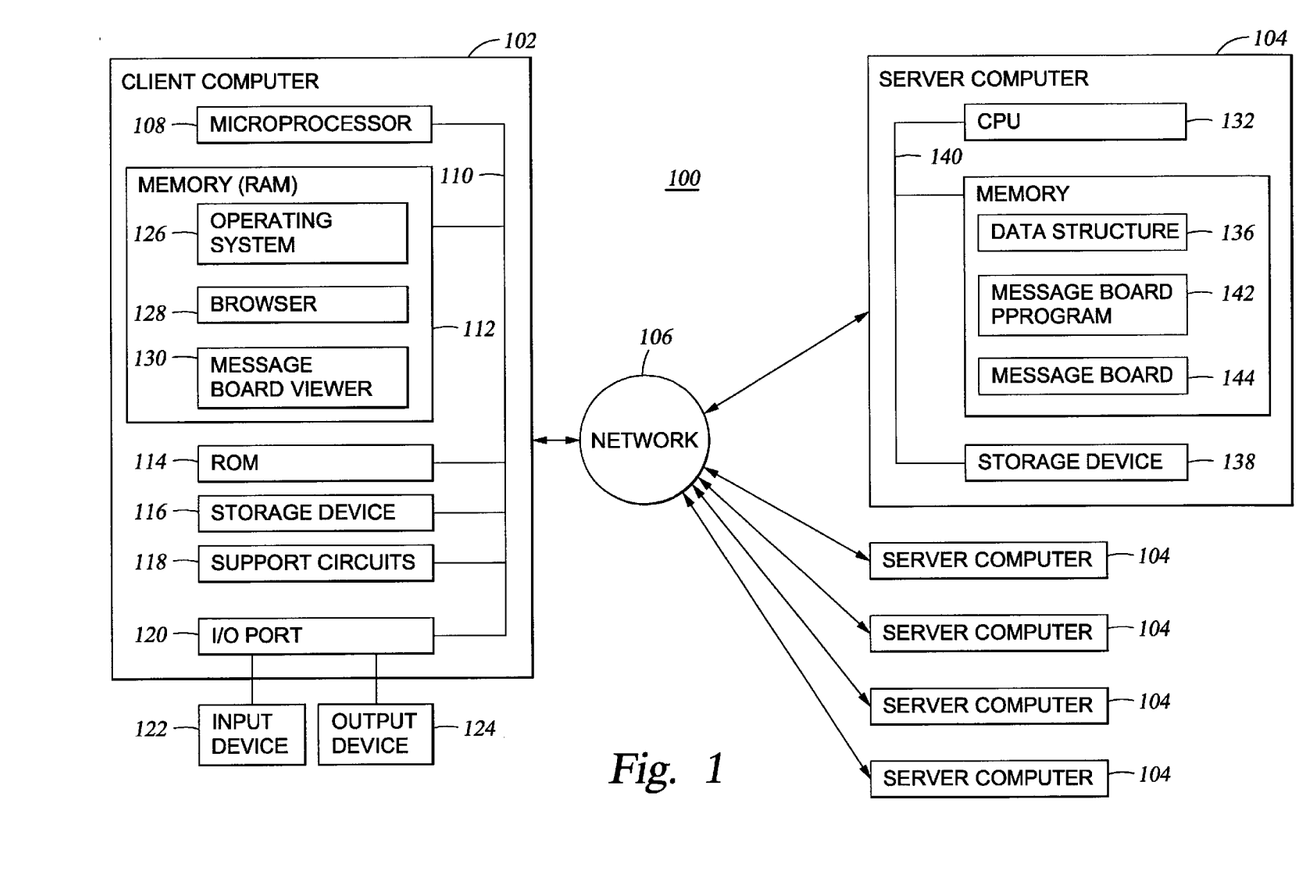
FIG. 1 depicts a high level block diagram of a computer system utilized in the present invention.

FIG. 1 depicts a computer network system 100 in which the preferred embodiment of the invention may be implemented. Specifically, the computer network system 100 generally comprises a client (e.g. user's) computer 102 and at least one server computer 104, e.g., an electronic message board server. Five such server computers 104 are shown in FIG. 1. The client computer 102 and the server computer 104 may be the components of the same computer network system, i.e., an Intranet, or may be connected via a public network 106, such as the Internet or a Plain Old Telephone Service (POTS) network.

The client computer 102 comprises a microprocessor 108 coupled to various components via a bus 110. Specifically, the bus 110 couples the microprocessor 108, a random access memory (RAM) 112, a read only memory (ROM) 114, a memory storage 116, support circuits 118, and an input/output port 120. The microprocessor 108 receives information from each of the computer components coupled to the system bus 108 and performs system operations based upon the requirements of a software operating system 126 and application software, e.g., a web browser 128 or an electronic message board viewer 130. Illustratively, the microprocessor 110 may comprise an Intel PENTIUM® type processor or the like.

The RAM 112 is volatile memory that contains the data and programming structures necessary for the operation of the client computer 102. Illustratively, the RAM 112 is shown containing the operating system 126, and application software, e.g., a browser program 128. Although the RAM 112 is shown as a single entity, the RAM 112 may also comprise a plurality of modules and may exist at multiple levels, e.g., high-speed registers and caches, low-speed and larger dynamic random access memory (DRAM) chips. The data and programming structures can be loaded into the RAM 112 from the storage device 116 as required. The storage device 116 may comprise a hard drive or some other Direct Access Storage Device (DASD), where software can be permanently stored. Although shown as a single unit, the storage device 116 could be a combination of fixed and/or removable storage devices, such as fixed disc drives, floppy disc drives, tape drives, removable memory cards, or optical storage. The ROM 114 typically includes a Basic Input-Output System (BIOS) program, which controls basic hardware operations such as the interaction of the microprocessor 108, storage device 116, an input device 122, or an output device 124. RAM 112, ROM 114 and the storage device 116 could be part of one virtual address space spanning multiple primary and secondary storage devices.

Support circuits 118 include controllers for the storage device 114, floppy drive, graphics display, and the like. The I/O port 120 includes various controllers for input devices 122, and output devices 124. The input device 122 may comprise a keyboard, keypad, light-pen, touch-screen, track-ball or any device capable of providing input to the client computer 102. The output device 124 may preferably comprise a display screen. Although the input device 122 is shown separately from the output device 124, the input device 122 may also be combined with the output device 124. For example, a display screen may have an integrated touch-screen or an integrated keyboard.

The operating system 126 is capable of interfacing with all of the hardware components of the computer 102. One such operating system 126 is the IBM OS/2 WARP 4.0® system.

Figure 2:
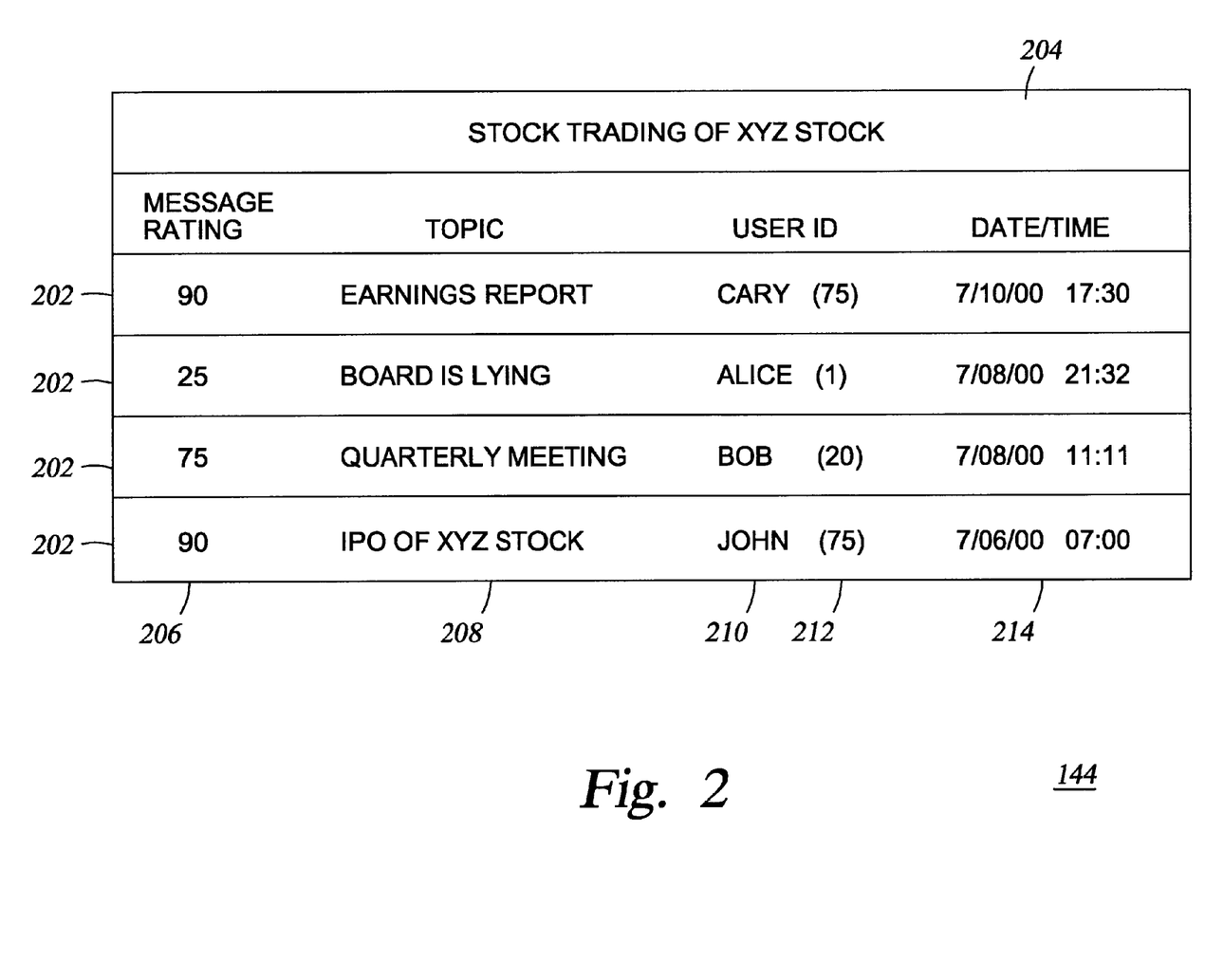
FIG. 2 depicts a view of an electronic message board containing at least one electronic message.

Each server computer 104 comprises a CPU 132 coupled to a memory 134 and a storage device 138 via a bus 140. Memory 134 is a random access memory sufficiently large to hold the necessary programming and data structures 136 that are located on the server computer 104. The memory 134 is illustratively shown containing a message board program 142 and an electronic message board. When executing the message board program 142, the server computer 104 operates as an electronic message board server. Such an electronic message board server is utilized to service requests from the client computer 102 regarding electronic message boards. The electronic message board is accessible by a user of the electronic message board viewer 130 in accordance with the present invention. An example of the electronic message board is depicted in FIG. 2.

Communications between the client computer 102 and any of the server computers 104 via the network 106 may occur in any standard format that allows the transfer of electronic messages from one device to another. Such communication channels may include modem connections, wired local area networks (e.g., ETHERNET or Token Ring), wireless communications, and the like. Each communications medium has its own communication protocols for transferring and receiving information from another source. For example, the transfer protocols may include protocols for modems, a File Transfer Protocol (FTP), Asynchronous Transfer Mode (ATM), Hyper Tech Transfer Protocol (HTTP) for networked systems, and the like.

FIG. 1 is merely one hardware configuration for computer network system 100. The embodiments of the present invention can apply to any comparable hardware configuration, regardless of whether the computer system is a complicated, multi-user computing apparatus, a single-user workstation, or network appliance that does not have non-volatile storage of its own.

Additionally, FIG. 1 may provide additional software implementations for the computer network system 100. For example, FIG. 1 may be described in the context of using a browser program 128 to access web pages comprising electronic message boards. Such a web browser or browser program 128 is an application program that allows viewing the content from server computers 104 and navigating among various server computers 104 via the Internet 106. In particular, the web browser 128 is a program, which is capable of parsing and presenting an electronic document, e.g., a web page, written in hypertext markup language (HTML) or other programming languages. The browser program 128 in the client computer 102 is the local browser utilized by a user, and is coupled to the Internet 106 via a communications medium such as telephone wire, cable, wireless device, and the like. Examples of the browser program 128 include the Netscape Navigator and the Internet Explorer.

As will be described below, aspects of the preferred embodiment pertain to specific method steps implementable on computer systems. In another embodiment, the invention may be implemented as a computer program-product for use with a computer network system 100. The programs defining the functions of the preferred embodiment can be provided to a computer via a variety of signal-bearing media, which include but are not limited to, (a) information permanently stored on non-writable storage media (e.g. read-only memory devices within a computer such as read only CD-ROM disks readable by a CD-ROM or DVD drive; (b) alterable information stored on a writable storage media (e.g. floppy disks within diskette drive or hard-disk drive); or (c) information conveyed to a computer by communications medium, such as through a computer or telephone network, including wireless communication. Such signal-bearing media or computer-readable media, when carrying computer-readable instructions that direct the functions of the present invention, represent alternative embodiments of the present invention. It may also be noted that portions of the product program may be developed and implemented independently, but when combined together are embodiments of the present invention.

FIG. 2 depicts an electronic message board 144 containing at least one electronic message entry 202. The electronic message board 144 is accessed from the server computer 104 and displayed on the display device 124. The electronic message board 144 illustratively contains four electronic message entries 202. Each electronic message entry 202 is generally represented as a row on the electronic message board 144. Although the electronic message entry 202 is illustratively shown to represent one electronic message, each electronic message entry 202 may also represent a plurality of electronic messages that are "threaded" together. Such a plurality of electronic messages comprises an initially posted electronic message and all other electronic messages that are provided in response to the initially posted electronic message.

The electronic message board 144 includes a title bar 204. Additionally, the electronic message board 144 includes a message rating 206, a topic identifier 208, a user identifier 210, a user rating 212 and a timestamp 214 for each electronic message entry 202. The title bar 204 describes the subject matter of the electronic message board 144. The message rating 206 represents a rating of the posted electronic message in the electronic message entry 202. The topic identifier 208 represents a topic or heading of an electronic message posted on the electronic message board 144. The user identifier 210 represents the username or alias of a user posting the electronic message. The user rating 212 represents the rating of the user identified by the user identifier 210. One embodiment of a method for determining the user rating is described with respect to FIG. 4. The timestamp 214 represents the date and time of the electronic message that is posted by a user (from the client computer 102). Other types of fields are also contemplated within the scope of the present invention. For example, the electronic message board 144 may also include a message count, which represents the number of electronic messages that are threaded with an initially posted electronic message.

Figure 3:
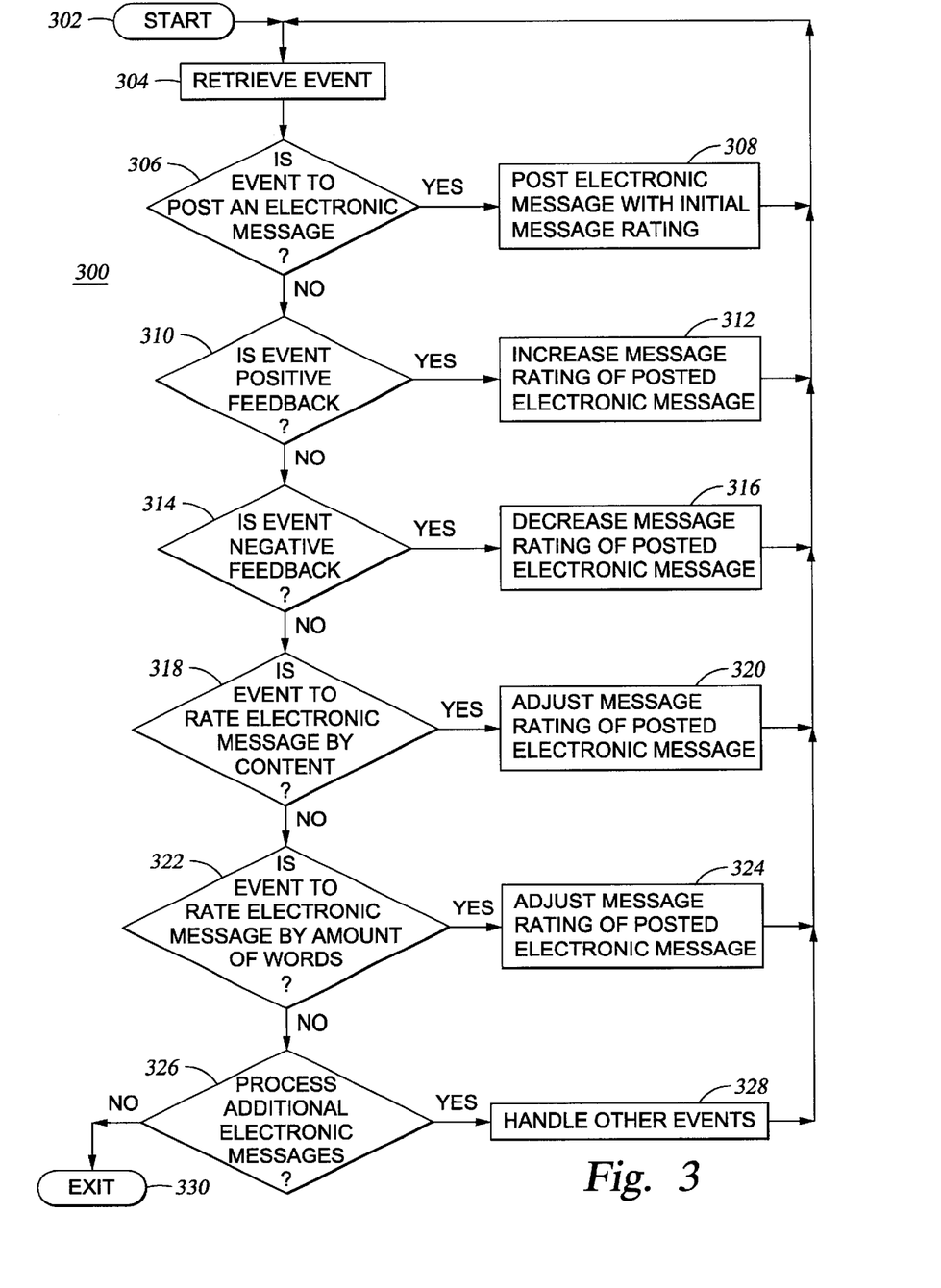
FIG. 3 depicts a flow diagram of a method for determining a message rating of an electronic message in accordance to one embodiment of the present invention.

In accordance with one embodiment of the present invention, a method for determining the message rating 206 is described with respect to FIG. 3. The message rating 206 is illustratively shown as a value between 0–100, where a higher value represents a higher rating. For example, the electronic message posted by Alice has a very low message rating 206 of "25," while the electronic messages posted by Cary and John have a much higher message rating 206 of "90." Although the message rating 206 is described in terms of a numerical value between 0–100, other ways to represent the message rating 206 are contemplated within the scope of the invention. For example, the message rating 206 may be represented with different colors, different numerical ranges or highlighting the electronic message having a rating above some threshold value. Moreover, the message board 144 may be configured to only display electronic messages having a message rating 206 above a threshold value.

FIG. 3 depicts a flow diagram of a method 300 for determining a message rating 206 of an electronic message in accordance to one embodiment of the present invention. The method 300 operates in an event-driven manner, i.e., the method 300 retrieves events and performs different steps depending on a particular event retrieved. The method 300 starts at step 302 and proceeds to retrieve an event at step 304. Such events may represent a particular command from a user, e.g., posting an electronic message on the electronic message board 144, providing positive feedback to a posted electronic message, or selecting an option on a web page.

At step 306, the method 300 queries whether the event is to post an electronic message on the electronic message board 144. If the event is to post an electronic message, the method 300 proceeds to step 308, where the electronic message is posted, e.g. established, on the electronic message board with an initial message rating 206. In one embodiment, the initial message rating 206 is dependent on the user rating 212 of a user posting the electronic message. For example, a higher user rating 212 may influence a higher initial message rating 206. After providing the initial message rating 206 for the electronic message to be posted on the electronic message board 144, the method 300 returns to retrieve the next event at step 304.

If the event is not to post an electronic message on the electronic message board 144, the method 300 proceeds to step 310, where a query determines whether the event is positive feedback for the electronic message posted on the electronic message board 144. Such positive feedback may comprise a positive comment provided by another user or viewer using the message board program 142. If the event is positive feedback for a posted electronic message, the method 300 proceeds to step 312, where the message rating 206 is increased for the posted electronic message. The degree of this increase is dependent upon the user rating (not shown) of the user providing the positive feedback on the posted electronic message. For example, the increase of the message rating is proportionally related to the user rating of the user providing the positive feedback. A determination of such user rating is further described with respect to FIGS. 4–7. If a first user has a higher user rating than a second user, the degree of the increase on the message rating 206 is greater for the first user. After increasing the message rating 206, the method 300 returns to retrieve the next event at step 304.

If the event is not positive feedback for the posted electronic message, the method 300 proceeds to step 314, where a query determines whether the event is negative feedback for the posted electronic message. Examples of negative feedback include a negative response message or other type of negative comment provided by another user or viewer using the message board program 142. If the event is negative feedback for the posted electronic message, the method 300 proceeds to step 316, where the message rating 206 is decreased for the posted electronic message. The degree of this decrease is dependent upon the user rating of the user providing the negative feedback on the posted electronic message. For example, the decrease of the message rating 206 is proportionally related to the user rating of the user providing the negative feedback. If a first user has a higher user rating than a second user, the degree of the decrease on the message rating 206 is greater for the first user. After decreasing the message rating, the method 300 returns to retrieve the next event at step 304.

If the event is not negative feedback for the posted message, the method 300 proceeds to step 318, where a query determines whether to adjust the rating of the electronic message (message rating 206) depending upon the type of content contained within the electronic message. The use of content to affect the rating of the electronic message may be provided as a user option or as a default setting in the message board program 142. If the message rating 206 is dependent upon content, the method 300 proceeds to step 320, where the message rating 206 of the electronic message is adjusted in accordance to the content contained within the electronic message. For example, the message rating 206 of the electronic message may be increased if the content of the electronic message is considered important. Illustratively, the importance of content may be determined according to a number of keywords in the electronic message. For example, an electronic message may be considered important if the number of keywords contained in the electronic message exceeds a threshold number, where the keywords are related to the topic of the message board 144. For example, if the electronic message board is directed to the trading of XYZ stock, the keywords may contain words related to stock trading. After adjusting the rating 206 of the electronic message, the method 300 returns to retrieve the next event at step 304.

If the message rating 206 is not dependent upon content, the method 300 proceeds to step 322, where a query determines whether the message rating 206 of the electronic message is dependent upon the amount or number of words contained within the electronic message. The use of the number of words to affect the rating 206 of the electronic message may be provided as a user option or as a default setting. If the message rating 206 is dependent upon the amount of words contained within the electronic message, the method 300 proceeds to step 324. At step 324, the message rating 206 is adjusted in accordance to the number of words contained within the electronic message. For example, the message rating 206 of the electronic message is increased if the number of words contained in the electronic message exceeds a threshold number. After adjusting the message rating 206 of the electronic message, the method 300 returns to retrieve the next event at step 304.

If the message rating 206 is not dependent upon the amount of words contained within the electronic message, the method 300 proceeds to step 326, where a query determines whether to process additional electronic messages in the electronic message board 144. If additional electronic messages are to be processed, the method 300 proceeds to handle other events at step 328 and returns to retrieve the next event at step 304. Such other events may include retrieving an electronic message from a client terminal 102 or displaying the electronic message on a display device 124. If no additional electronic messages are to be processed, the method 300 proceeds to exit at step 330.

The method 300 utilized for determining a message rating of an electronic message is not limited to the factors specified in steps 306, 310, 314, 318 and 322. In another embodiment of the method 300, the message rating 206 may be adjusted if neutral feedback is received or if the posted electronic message becomes stale, e.g., the posted electronic message has been on the message board 144 past a threshold amount of time. Moreover, the message rating 206 may comprise a weighted rating dependent upon a variety of factors.

Figure 4:
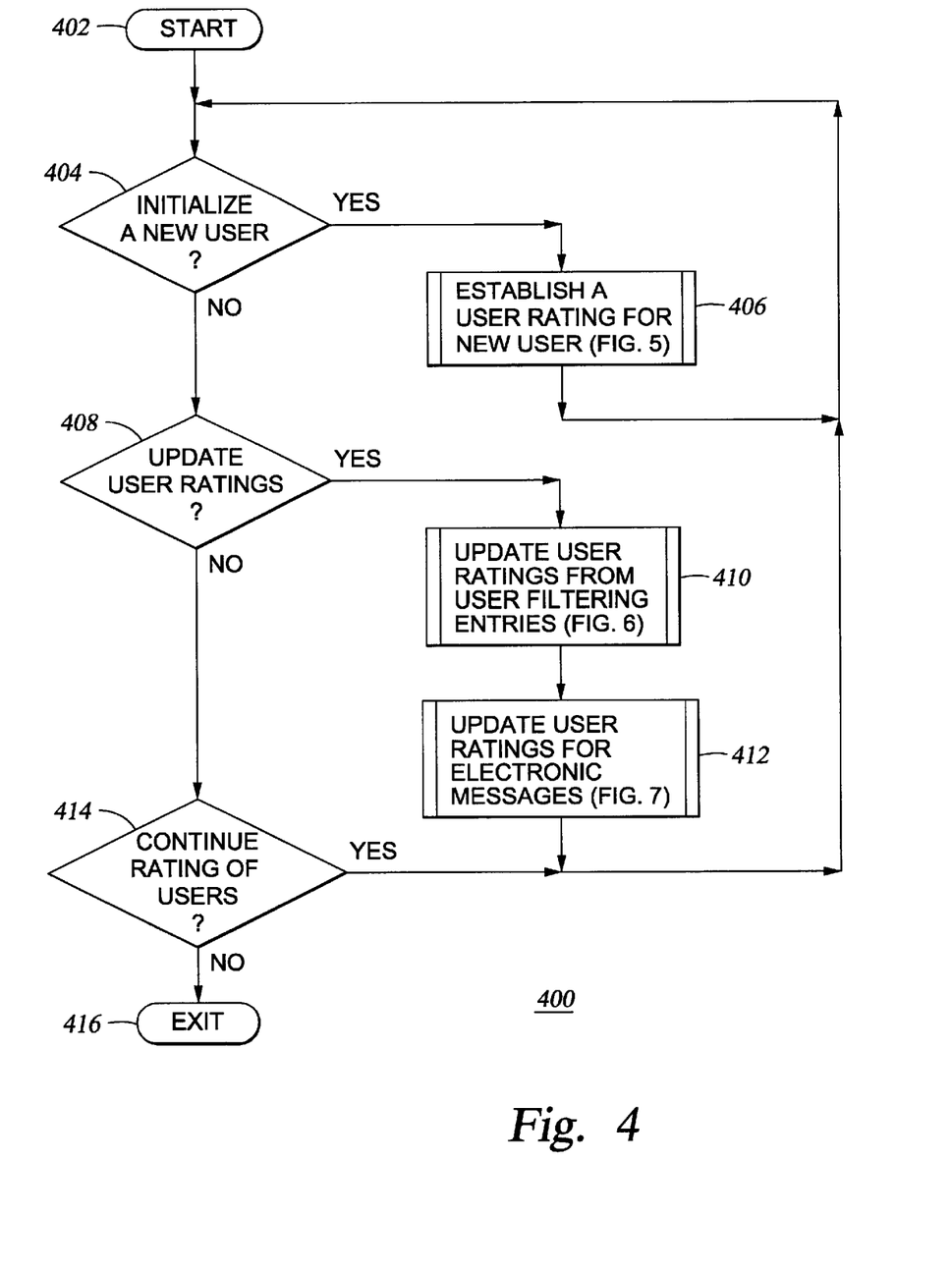
FIG. 4 depicts a flow diagram of a method for determining a user rating of a user posting an electronic message in accordance to another embodiment of the present invention.
Figure 5:
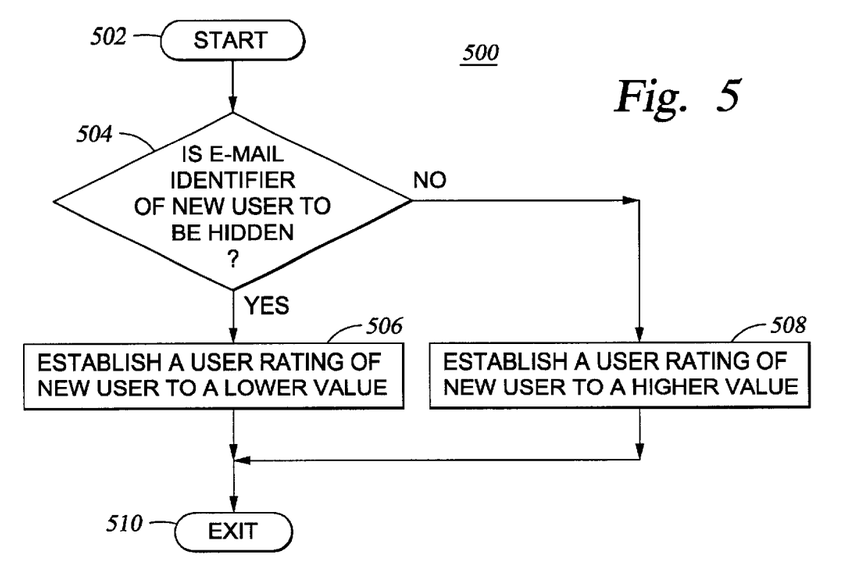
FIG. 5 depicts a flow diagram of a first method utilized for determining the user rating in FIG. 4.
Figure 6:
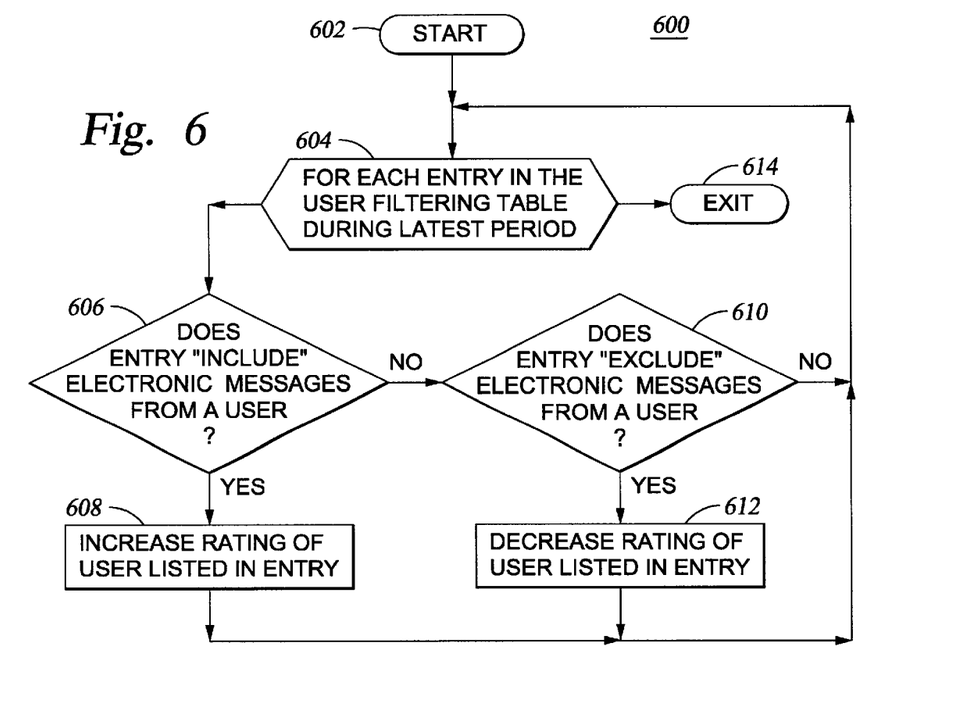
FIG. 6 depicts a flow diagram of a second method utilized for determining the user rating in FIG. 4.
Figure 7:
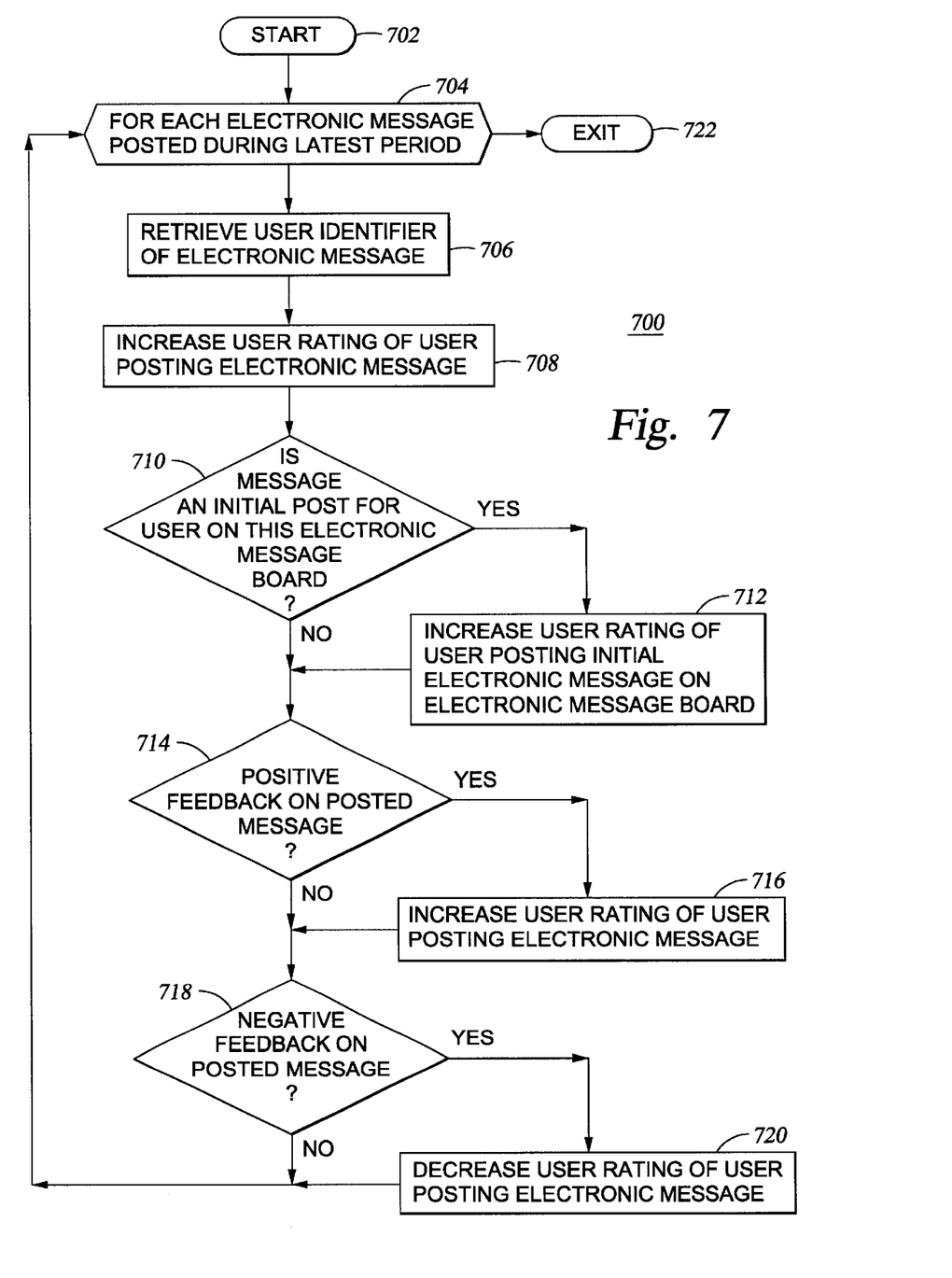
FIG. 7 depicts a flow diagram of a third method utilized for determining the user rating in FIG. 4.

FIG. 4 depicts a flow diagram of a method 400 for determining a user rating 212 of a user posting an electronic message in accordance with another embodiment of the present invention. FIG. 5 depicts a flow diagram of a first method 500 utilized to determine the user rating 212 in FIG. 4. FIG. 6 depicts a flow diagram of a second method 600 utilized to determine the user rating 212 in FIG. 4. FIG. 7 depicts a flow diagram of a third method 700 utilized to determine the user rating 212 in FIG. 4. To best understand the invention, the reader should simultaneously refer to FIGS. 4–7.

Referring to FIG. 4, the method 400 starts at step 402 and proceeds to step 404, where a query determines whether the event is to initialize a new user. Such initialization of a new user may occur when a user posts an initial message on the message board 144 or registers with a provider of the message board 144. If the event is to initialize a new user, the method 400 proceeds to step 406, where a user rating 212 is established for the new user. Step 406 is embodied in a method 500 described below with respect to FIG. 5. After establishing the user rating at step 406, the method 400 returns to step 404.

If the event is not to initialize a new user, the method 400 proceeds to step 408, where a query determines whether the event is to update user ratings 212 on the message board 144. For example, the user ratings 212 may be updated on a periodic basis, e.g., every night. If the event is update the user ratings 212, the method 400 proceeds to step 410, where the user ratings 212 are updated according to user filtering selections. Step 410 is embodied in a method 600 described below with respect to FIG. 6. The method 400 proceeds to step 412, where the user ratings 212 are updated for the electronic messages. Step 412 is embodied in a method 700 described below with respect to FIG. 7. After updating the user ratings 212 in steps 410 and 412, the method 400 returns to step 404.

Returning to step 408, if the event is not to update the user ratings 212, the method 400 proceeds to step 414, where a query determines whether to continue rating of users. If the rating of users is to be continued, the method 400 returns to retrieve the next event at step 404. If the rating of users is not to be continued, the method 400 proceeds to exit at step 416.

Referring to FIG. 5, the method 500 is entered from step 406. More specifically, the method 500 starts at step 502 and proceeds to step 504, where a query determines whether the electronic mail (e-mail) identifier of a new user of the message board 144 is hidden or kept private from other users or viewers of the message board 144. This e-mail identifier may be different than the user identifier 206 listed on the message board 144. If the e-mail identifier is hidden, the method 500 establishes the user rating 212 of the new user to a lower value at step 506 and proceeds to step 510. If the e-mail identifier is not hidden, i.e., public, the method 500 establishes the user rating 212 of the new user to a higher value at step 508 and proceeds to step 510. In this case, the user is given a higher user rating 212, since a user is initially considered more credible or trustworthy if the e-mail identifier of the user is not hidden from other users of the electronic message board 144. At step 510, the method 500 exits, i.e., returns to step 406. Although FIG. 5 is described with respect to an e-mail identifier, FIG. 5 may also apply to other types of user input data verifiable by other users. For example, such "verifiable user data" may also include the originating city or Internet Protocol (IP) address of the new user.

Referring to FIG. 6, the method 600 is entered from step 410. More specifically, the method 600 starts at step 602 and proceeds to step 604, where each "user filtering" entry over a recent period is considered. Such "user filtering" entries represent data structures 136 that are utilized for specifically including or excluding all electronic messages by a selected user from appearing on the message board 144. For example, if a first user becomes annoyed by the posted electronic messages of a second user, the first user may utilize a "user filtering" entry to exclude all electronic messages from appearing on the first user's display of the message board 144. The "user entries" are stored in the storage device 138 over the recent period, e.g., one day as in step 408, and prior to execution of the method 600.

The method 600 proceeds to step 606, where a query determines whether the "user filtering" entry is to include electronic messages that are posted on the message board 144 by a particular user. If the "user filtering" entry is to include electronic messages by a particular user, the method 600 proceeds to step 608, where the rating 212 of the user in the "user" filtering entry is increased. The degree of increase on the user rating 212 of a first user is dependent upon the user rating (not shown) of a second user providing the "user filtering entry" to include messages of the first user. For example, the increase on the user rating 212 of the first user may be proportionally related to the user rating of the second user providing the "user" filtering entry. After increasing the user rating 212, the method 600 returns to process the next "user filtering" entry at step 604. If the "user filtering" entry is not to include electronic messages that are posted by a particular user, the method 600 proceeds to step 610.

At step 610, a query determines whether the "user filtering" entry is to exclude electronic messages that are posted on the message board 144 by a particular user. If the "user filtering" entry is to exclude electronic messages by a particular user, the method 600 proceeds to step 612, where the rating 212 of the user designated in the "user filtering" entry is decreased. The degree of decrease of the user rating 212 of a first user is dependent upon the user rating of a second user providing the "user" filtering entry. For example, the decrease on the user rating 212 of the first user may be proportionally related to the user rating (not shown) of the second user providing the "user" filtering entry. After decreasing the user rating 212, the method 600 returns to process the next "user filtering" entry at step 604.

If the "user" filtering entry is neither to include (step 406) nor exclude (step 610) an electronic message by a particular user, the method 600 returns to process the next "user filtering" entry at step 604. Once all the "user filtering" entries are processed at step 604, the method 600 exits at step 614, i.e., returns to step 410.

Referring to FIG. 7, the method 700 is entered from step 412 of FIG. 4. More specifically, the method 700 starts at step 702 and proceeds to step 704, where each electronic message that is posted during a recent period, e.g., one day, is processed. The method 700 proceeds to step 706, where the user identifier 210 of the posted electronic message is retrieved. At step 708, the user rating 212 is increased for the user posting the electronic message. Namely, step 708 provides an initial increase to the user rating 212 of the user posting an electronic message on the message board 144.

The method 700 proceeds to step 710, where a query determines whether the electronic message is an initial or first electronic message posted by a user on the message board 144. If the electronic message is the initial or first electronic message posted by the user on the message board 144, the method 700 proceeds to step 712, where the user rating 212 is increased for the user posting an initial electronic message on the message board 144. Namely, step 712 provides an additional increase to the user rating 212 when the user initially posts an electronic message on a particular electronic message board 144. After increasing the user rating 212 in step 712, the method 700 proceeds to step 714. Returning to step 710, if the electronic message is not the initial or first posted message posted by the user on the message board, the method 700 proceeds to step 714.

At step 714, a query determines whether the posted electronic message received positive feedback. Examples of positive feedback include a positive response message or other type of positive comment provided by another user or viewer using the message board program 142. If the posted electronic message received positive feedback, the method 700 proceeds to step 716, where the user rating 212 is increased for the user posting the electronic message on the message board 144. The degree of increase on the user rating 212 is dependent upon the user rating (not shown) of the user providing the positive feedback on the posted electronic message. For example, the increase of the user rating 212 may be proportionally related to the user rating of the user providing the positive feedback. After increasing the user rating in step 716, the method 700 proceeds to step 718. Returning to step 714, if the posted electronic message received positive feedback, the method 700 proceeds to step 718.

At step 718, a query determines whether the posted electronic message received negative feedback. Such negative feedback may comprise a negative response message or other type of negative comment provided by another user or viewer using the message board program 142. If the posted electronic message received negative feedback, the method 700 proceeds to step 720, where the user rating 212 is decreased for the user posting the electronic message on the message board 144. The degree of decrease on the user rating 212 is dependent upon the user rating of the user providing the positive feedback on the posted electronic message. For example, the decrease of the user rating 212 may be proportionally related to the user rating of the user providing the positive feedback. After decreasing the user rating 212 in step 720, the method 700 returns to step 704, where the next posted electronic message is processed. Returning to step 718, if the posted electronic message received positive feedback, the method 700 returns to step 704, where the next posted electronic message is processed. Once all the electronic messages are processed at step 704, the method 700 exits at step 722, i.e., returns to step 412.

The methods 600 and 700 utilized for updating a user rating 212 of an electronic message are not limited to the factors specified in steps 606, 610, 710, 714 and 718. In another embodiment of the method 300, the user rating 212 may be adjusted if neutral feedback is received or decreased if the same user posts more than a threshold number of electronic messages during a specific time interval. Moreover, the user rating 212 may comprise a weighted rating dependent upon a variety of factors.

While the foregoing is directed to the preferred embodiment of the present invention, other and further embodiments of the invention may be devised without departing from the basic scope thereof, and the scope thereof is determined by the claims that follow.

What is claimed is:

1. A method for processing electronic messages on an electronic message board, the method comprising:

posting an electronic message from a first user on the electronic message board, the first user having a user rating specific to the first user and applied to determine a weight given to the first user's message rating of electronic messages;

upon posting the electronic message to the electronic message board, establishing a message rating for the electronic message based on the user rating of the first user;

adjusting the message rating in response to feedback from other users, where the degree of adjustment of the message rating is dependent upon a respective user rating of each of the other users; and adjusting the user rating of the first user in response to feedback from the other users, where the degree of adjustment of the user rating is dependent upon the respective user rating of each of the other users.

2. The method of claim 1 further comprising:

including the electronic message on the electronic message board only if the message rating of the electronic message remains above a threshold value.

3. The method of claim 1 wherein the message rating of the electronic message represents a relevance to a topic of the electronic message board.

4. The method of claim 1 wherein a subsequent electronic message posted by the first user on the electronic message board is rated on the basis of the adjusted user rating of the first user.

5. The method of claim 1 wherein the step of adjusting comprises:

increasing the message rating of the electronic message if the feedback from the second user is positive.

6. The method of claim 1 wherein the step of adjusting comprises:

decreasing the message rating of the electronic message if the feedback is negative from the second user.

7. The method of claim 1 wherein a degree of adjustment of the message rating is related to the user rating of the second user.

8. The method of claim 1 further comprising:

adjusting the message rating of the electronic message according to content of the electronic message.

9. The method of claim 8 wherein message rating of the electronic message is increased if content of the electronic message is considered important with respect to a topic of the electronic message board.

10. The method of claim 9 wherein the content of the electronic message is important if the number of keywords in the electronic mail message exceeds a threshold number, where the keywords are related to the topic of the electronic message board.

11. The method of claim 1 further comprising:

adjusting the message rating of the electronic message according to a number of words contained in the electronic message.

12. The method of claim 11 wherein the message rating of the electronic message is increased if the number of words contained in the electronic message exceeds a threshold number.

13. The method of claim 1, further comprising:

establishing the user rating of the first user upon posting the electronic message to the electronic message broad, wherein the user rating of the first user is established at a higher level if an electronic mail identifier of the first user is viewable by the other users viewing the electronic message on the electronic message board.

14. The method of claim 1 wherein the step of adjusting comprises:

increasing the first user rating of the first user if the feedback is positive.

15. The method of claim 1 wherein the step of adjusting comprises:

decreasing the first user rating of the first user if the feedback is negative.

16. The method of claim 1 wherein the first user rating is adjusted upwards if a user has elected to view the electronic message posted by the first user.

17. The method of claim 1 wherein the step of adjusting comprises:

decreasing the first user rating of the first user if a user has specifically excluded viewing the electronic message posted by the first user.

18. The method of claim 1, further comprising:

increasing the first user rating of the first user if the electronic message from the first user that is posted on the message board is posted on a different message board.

19. The method of claim 1, further comprising establishing an initial user rating of a first user, the initial user rating being independent of feedback from other users.

20. An apparatus for processing an electronic message on an electronic message board, the apparatus comprising:

a memory for storing an electronic message board program; and a processor coupled to the memory, for performing a method upon executing the electronic message board program retrieved from the memory, the method comprising:

receiving the electronic message from a client computer of a first user via a network, the first user having a user rating specific to the first user and applied to determine the weight given to the first user's message rating of electronic messages;

upon receiving the electronic message from the client computer:

(i) posting the electronic message to the electronic message board; and (ii) establishing a message rating for the electronic message on the basis of the user rating of the first user;

adjusting the message rating in response to feedback from other users, where the degree of adjustment of the message rating is dependent upon a respective user rating of each of the other users; and adjusting the user rating of the first user in response to feedback from the other users, where the degree of adjustment of the user rating is dependent upon the respective user rating of each of the other users.

21. The apparatus of claim 20 further comprising:

a display device, coupled to the processor, displaying the message rating with the electronic message on the electronic message board.

22. The apparatus of claim 21 where the displaying occurs if the message rating of the electronic message remains above a threshold value.

23. The apparatus of claim 20 wherein the degree of adjustment of the message rating is proportionally related to the respective user rating of the other user.

24. The apparatus of claim 20 wherein the first user and the other users each utilize a client computer.

25. A computer readable medium storing a software program that, when executed by a computer, causes a processor to perform a method comprising:

upon receiving an electronic message from a first user to be posted on an electronic message board:

(i) posting the electronic message from the first user on the electronic message board, the first user having a user rating specific to the first user and applied to determine the weight given to the first user's message rating of electronic messages; and (ii) establishing a message rating for the electronic message based on the user rating of the first user;

adjusting the message rating in response to feedback from other users, where the degree of adjustment of the message rating is dependent upon a respective user rating of each of the other users; and adjusting the user rating of the first user in response to feedback from the other users, where the degree of adjustment of the user rating is dependent upon the respective user rating of each of the other users.

26. The computer readable medium of claim 25 wherein the method further comprises:

including the electronic message on the electronic message board only if the message rating of the electronic message remains above a threshold value.

27. The computer readable medium of claim 25 wherein the message rating of the electronic message represents a relevance to a topic of the electronic message board.

28. The computer readable medium of claim 25 wherein the user rating of the first user is utilized to establish the message rating.

29. The computer readable medium of claim 28 wherein the user rating of the first user is adjusted in response to feedback from the second user, where the degree of adjustment of the user rating of the first user is dependent upon the user rating of the second user.

30. The computer readable medium of claim 25 wherein the step of adjusting comprises:

increasing the message rating of the electronic message if the feedback from the second user is positive.

31. The computer readable medium of claim 25 wherein the step of adjusting comprises:

decreasing the message rating of the electronic message if the feedback is negative from the second user.

32. The computer readable medium of claim 25 wherein a degree of adjustment of the message rating is related to the user rating of the second user.

33. The computer readable medium of claim 25 wherein the method further comprises:

adjusting the message rating of the electronic message according to content of the electronic message.

34. The computer readable medium of claim 33 wherein message rating of the electronic message is increased if content of the electronic message is considered important with respect to a topic of the electronic message board.

35. The computer readable medium of claim 34 wherein the content of the electronic message is important if the number of keywords in the electronic mail message exceeds a threshold number, where the keywords are related to the topic of the electronic message board.

36. The computer readable medium of claim 25 further comprising:

adjusting the message rating of the electronic message according to a number of words contained in the electronic message.

37. The computer readable medium of claim 36 wherein the message rating of the electronic message is increased if the number of words contained in the electronic message exceeds a threshold number.

38. The computer readable medium of claim 25, further comprising:

establishing the user rating of the first user upon posting the electronic message to the electronic message broad, wherein the user rating of the first user is established at a higher level if an electronic mail identifier of the first user is viewable by the other users viewing the electronic message on the electronic message board.

\* \* \* \* \*